(12) United States Patent
Shafaat

(10) Patent No.: US 8,830,090 B2
(45) Date of Patent: Sep. 9, 2014

(54) DISPLAY OF CURRENT TREND AND/OR FUTURE POSITION OF VEHICULAR TRAFFIC

(75) Inventor: Syed Tahir Shafaat, Everett, WA (US)

(73) Assignee: The Boeing Company, Chicago, IL (US)

( * ) Notice: Subject to any disclaimer, the term of this patent is extended or adjusted under 35 U.S.C. 154(b) by 541 days.

(21) Appl. No.: 13/178,868

(22) Filed: Jul. 8, 2011

(65) Prior Publication Data

US 2013/0009792 A1 Jan. 10, 2013

(51) Int. Cl.
*G01C 21/00* (2006.01)
*G01C 23/00* (2006.01)
*G08G 5/00* (2006.01)

(52) U.S. Cl.
CPC .............. *G08G 5/0008* (2013.01); *G01C 23/00* (2013.01); *G08G 5/0052* (2013.01); *G08G 5/0082* (2013.01); *G08G 5/0026* (2013.01); *G08G 5/0078* (2013.01); *G08G 5/0013* (2013.01); *G08G 5/0021* (2013.01)
USPC ........... 340/979; 340/961; 340/971; 340/980; 342/27; 342/29; 342/61; 701/9; 701/10; 701/14; 701/301

(58) Field of Classification Search
USPC ............ 340/979, 971, 972, 980, 995.17, 945, 340/961; 342/27, 29, 61, 63; 701/10, 13, 701/300, 301, 9, 14, 120, 121, 428
See application file for complete search history.

(56) References Cited

U.S. PATENT DOCUMENTS

| | | | |
|---|---|---|---|
| 7,006,032 B2 | 2/2006 | King et al. | |
| 7,382,284 B1 | 6/2008 | Armstrong et al. | |
| 7,646,313 B2 * | 1/2010 | Winkler et al. | 340/961 |
| 7,893,866 B2 | 2/2011 | Dark et al. | |
| 8,027,758 B2 * | 9/2011 | Ferro et al. | 701/18 |
| 2002/0089432 A1 * | 7/2002 | Staggs et al. | 340/945 |
| 2006/0265109 A1 * | 11/2006 | Canu-Chiesa et al. | 701/3 |
| 2007/0241935 A1 | 10/2007 | Pepitone et al. | |
| 2009/0109065 A1 * | 4/2009 | Pinheiro | 340/971 |
| 2009/0219197 A1 * | 9/2009 | Bunch | 342/26 B |
| 2010/0060511 A1 | 3/2010 | Nouvel et al. | |

FOREIGN PATENT DOCUMENTS

JP 2009248765 A 10/2009

OTHER PUBLICATIONS

International Civil Aviation Organization Asia and Pacific Office; APANPIRG/19, agenda item 3.4, Appendix O; Sep. 2008; "Guidance material on issues to be considered in ATC multi-sensor fusion processing including the integration of ADS-B data".
Application No. GB1212216.4, Combined Search and Examination Report, Nov. 6, 2012.

(Continued)

*Primary Examiner* — Hung T Nguyen
(74) *Attorney, Agent, or Firm* — Ostrager Chong Flaherty & Broitman P.C.

(57) ABSTRACT

Systems and methods are disclosed for displaying the current trends (i.e., turning or going straight) or the future positions of vehicles of interest on a traffic display unit. The position, orientation and geometry of the displayed symbology is a function of parametric information broadcast by the vehicles of interest and processed by a computer system that controls the traffic display unit. In particular examples disclosed herein, the traffic display unit is a navigation display on an aircraft or a traffic display unit at a traffic controller's station. However, the methods disclosed herein have application to vehicular traffic other than aircraft, such as boats or ships.

16 Claims, 7 Drawing Sheets

(56) References Cited

OTHER PUBLICATIONS

Geoghan, "Use of Aircraft Intent, Information in ATM DSS Functions," The Mitre Corp., Feb. 7, 2000.
Geoghan, "A Qualitative, Initial Evaluation of Decision Support System (DSS) Use of ADS-B Pilot Intent Information", The Mitre Corp., Sep. 2000.
Warren et al., "WG-b Intent Proposal for Revision A ADS-B MASPS," SC-186 Plenary Meeting on Proposed MASPS Changes, Dec. 12-13, 2001.
Krozel, "Intent Inference for Free Flight Aircraft", AIAA-00-4479, AIAA Guidance, Navigation and Control Conf., Denver CO, Aug. 2000.
White Paper: Common Trajectory Prediction-Related Terminology, http://sites.google.com/site/trajectorymgt/ap16 - - - white paper.
Maynard, Draft Text for DO-242A, TCP Terminology, 242A-WP-8-07, RTCA SC-186/WG-6, Meeting #8, Washington D.C., Sep. 26, 2001.

\* cited by examiner

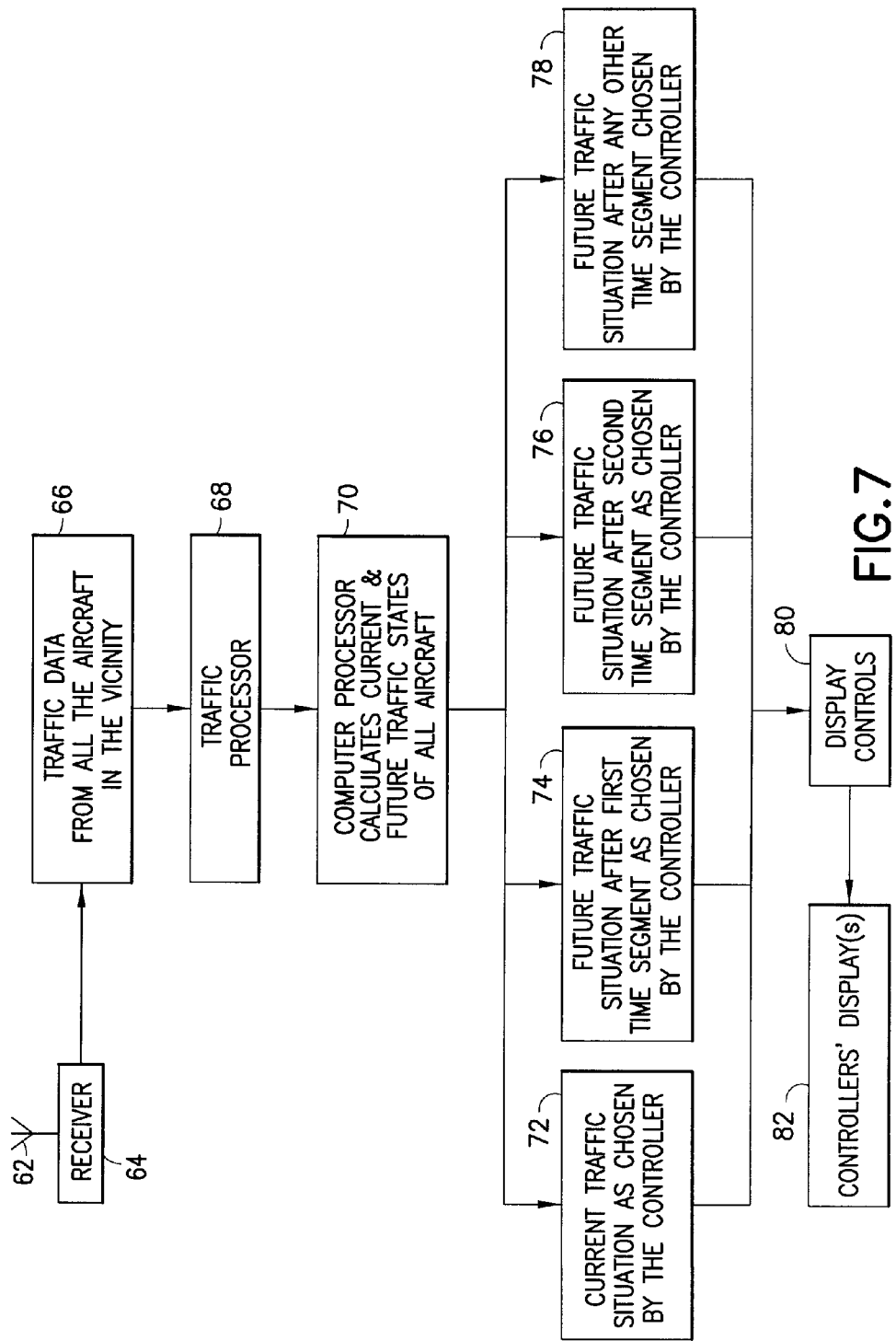

DISPLAY OF CURRENT TREND AND/OR FUTURE POSITION OF VEHICULAR TRAFFIC

BACKGROUND

The invention generally relates to systems and methods for displaying traffic information on a display unit. In particular, the disclosed embodiments relate to systems and methods for displaying air traffic on a traffic display unit, such as a navigation display located in the cockpit or on the flight deck of an aircraft, or a traffic display unit at a controller's station on the ground.

Modern aircraft typically include cockpit displays that are controlled by an information system. Cockpit displays include the basic displays that are supplied with the aircraft, and other add-on displays which vary in their degree of integration with the physical aircraft structure and aircraft systems. In a modern electronic cockpit, the flight instruments typically include a so-called "navigation display". A navigation display (which may be adjacent to the primary flight display) along with navigational information may show the current position of all aircraft within the display range and information. Current implementations of a navigation display range selection are typically in whole number increments (for example, 640, 320, 160, 80, 40, 20, and 10 nautical mile ranges) such that intermediate display range selections between the whole number increments are not utilized.

On existing navigation displays onboard many aircraft, the flight crew does not know if other airplanes represented by non-directional symbols on the display are turning or going straight. The flight crew has limited information about airplane traffic and has to monitor the traffic to determine its direction of travel.

With the introduction of Automatic Dependent Surveillance-Broadcast (ADS-B) technology for display of traffic in the flight deck, a typical display only provides the instantaneous heading/track (i.e., the direction of travel at that instant) of each other airplane. The typical navigation display with this new technology does not provide any information on the current state of the other airplane, i.e., whether it is turning or going straight. The only method available to the flight crew to determine the track of other airplanes is to constantly monitor the movement of each traffic symbol relative to the ownship symbol on the navigation display and estimate their future positions to evaluate if there is a potential conflict between ownship and other traffic.

The term "traffic display unit" will be used hereinafter to refer to display units that display symbology representing vehicular traffic of interest to a display unit viewer. Thus the term "traffic display unit", as used herein, includes navigation displays and other types of traffic display units onboard aircraft, as well as traffic display units onboard vehicles other than aircraft and traffic display units located at ground-based traffic controllers' stations.

There is a need for systems and methods for displaying the current trends (i.e., turning or going straight) or future positions of vehicles of interest to a display unit viewer. In particular, it is desirable that electronic traffic display units be able to display easily interpretable symbology indicating the current trends or future positions of traffic vehicles of interest so that potential conflicts can be identified by the viewer.

SUMMARY

Systems and methods are disclosed for displaying the current trends (i.e., turning or going straight) or the future positions of all traffic or only vehicles of interest on a traffic display unit. The position, orientation and geometry of the displayed symbology is a function of parametric information broadcast by the vehicles of interest and processed by a computer system that controls the traffic display unit. In particular examples disclosed herein, the traffic display unit is a navigation display or any other display unit in the flight deck where traffic is displayed on an aircraft or a traffic display unit at a traffic controller's station. However, the methods disclosed herein have application to vehicular traffic other than aircraft, such as boats or ships.

One aspect of the invention is a method for displaying traffic information on a traffic display unit, comprising: receiving data from a vehicle that indicates or can be used to derive a current position, a current heading and a current trend of the vehicle; and displaying symbology that indicates the current position, current heading and current trend of the vehicle relative to a frame of reference, wherein the symbology comprises a icon placed and oriented to indicate the current position and current heading of the vehicle, and a line or series of line segments extending away from the icon along a path that indicates the current trend of the vehicle.

Another aspect of the invention is a system for displaying traffic information, comprising a display screen and a computer system programmed to perform the operations set forth in the preceding paragraph.

A further aspect of the invention is a method for displaying traffic information on a traffic display unit, comprising: (a) receiving data from a vehicle that indicates or can be used to derive a current position, a current heading and a current trend of the vehicle; and (b) displaying symbology that indicates a future position and a future heading of the vehicle relative to a frame of reference Yet another aspect of the invention is a system for displaying traffic information, comprising a display screen and a computer system programmed to perform the operations set forth in the preceding paragraph.

Other aspects of the invention are disclosed and claimed below.

BRIEF DESCRIPTION OF THE DRAWINGS

FIG. 7 is a hybrid block diagram/flowchart showing a system and a method for displaying symbology representing air traffic which is in the vicinity of a traffic controller's station in accordance with another embodiment.

Reference will hereinafter be made to the drawings in which similar elements in different drawings bear the same reference numerals.

DETAILED DESCRIPTION

Figure 1:
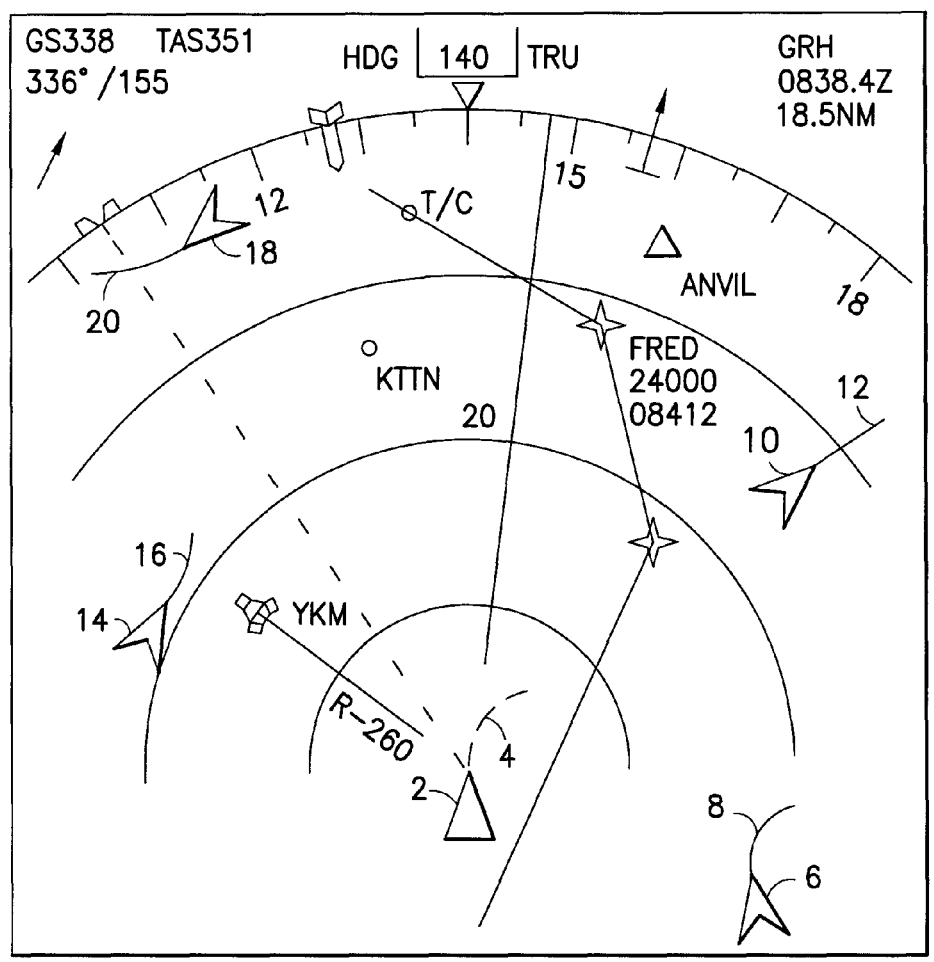
FIG. 1 is a diagram showing a screen of a cockpit navigation display unit that is displaying symbology indicating the current positions of aircraft and their current trends.

Various embodiments of the invention will now be described. In accordance with some methods, the current trends (i.e., turning or going straight) of vehicles of interest are displayed on a traffic display unit. In accordance with other methods, the future positions of vehicles of interest are displayed on a traffic display unit. In particular examples disclosed herein, the traffic display unit is a navigation display or any traffic display on an aircraft or a traffic display unit at a traffic controller's station.

Automatic Dependent Surveillance-Broadcast (ADS-B) is a surveillance technology for tracking aircraft. A significant number of aircraft flying today are equipped with ADS-B system and by year 2020 all aircraft operating within the airspace of the United States must be equipped with some form of ADS-B. ADS-B enhances safety by making an aircraft visible in real-time to air traffic control and to other suitably equipped aircraft with position and velocity data transmitted every second. The ADS-B system comprises a high-integrity GPS navigation source and a ADS-B datalink. When using an ADS-B system, a pilot is able to receive traffic information about aircraft in his vicinity and at farther distances. This information includes altitude, heading, speed and distance of other aircraft relative to the ownship. It has also been proposed that an ADS-B equipped aircraft send out other information like: turn rate, bank angle, etc. Such maneuver occurrence information for surrounding aircraft can be displayed to pilots on airborne traffic situation displays.

With the ADS-B system's implementation, it will be possible to broadcast the intent and other parameters of an airplane to other aircraft in the vicinity and to any traffic control tower within range. The embodiments disclosed herein take advantage of the ADS-B technology and graphically depict the current trend of another aircraft by displaying a straight line that extends from the tip of the icon representing that other aircraft in the direction of travel when the airplane is going straight, the length of the line indicating where the aircraft would be after a future predefined time interval. In contrast, if the other aircraft is turning left or right, a curved line emanating from the tip of the icon representing that other aircraft would be displayed to depict the track of the aircraft, the length of the arc showing the distance that would be traveled during a future predefined time interval, while the radius of the arc would indicate the turning radius of the other aircraft. The turning radius can be computed based at least in part on information transmitted by the other aircraft, including at least some of the following: speed, altitude, heading, current bank angle, maneuver occurrence, wind direction and wind speed. These lines or vectors can have different segments representing equal intervals of time. For example, if the future predefined time interval is 2 minutes, three line segments could be displayed, each segment representing the expected path of travel during a respective 40-second interval.

In addition, an ownship's navigation system can use the broadcast ADS-B information to extrapolate the future position of all aircraft of interest. The time interval for extrapolating the future positions of aircraft traffic can be set by the flight crew or by the traffic controller or can be a default value used by ownship's navigation system or the controllers workstation depending upon the traffic environment or phase of flight or airspace region. These extrapolated positions of the aircraft in the vicinity of ownship can be shown in differently colored or differently shaped symbols to differentiate them from other traffic symbols. The extrapolated traffic position display page can be a different page on the same display unit that displays the current positions and trends of aircraft of interest or can be a page on a display unit other than the display unit that displays the current positions and trends. This technology also has application in air traffic controller stations for displaying future positions of aircraft in the vicinity thereof.

A specific example of a traffic display unit will now be described with reference to FIG. 1, which shows a screen of a cockpit navigation display unit that is displaying symbology indicating the current positions and trends of ownship and of other aircraft of potential interest to ownship's flight crew. The equilateral triangle 2 (hereinafter "ownship icon 2") in the middle and near the bottom of the screen represents the ownship, while a set of three equally spaced line segments 4 (i.e., trend vector) represent the path or track that ownship will travel during the next future predefined interval of time. The dashed straight line extending from the vertex of ownship icon 2 is a well-known means of indicating the planned or desired heading of ownship. As will be readily appreciated by persons skilled in the art of cockpit displays, as ownship moves relative to Earth, the position of ownship icon 2 (which represents ownship) on the display screen seen in FIG. 1 will not change, but rather the star-shaped symbols representing waypoints and other symbols representing stationary landmarks (e.g., the circle labeled KTTN and the triangle labeled ANVIL) will move relative to ownship icon 2.

The screen of FIG. 1 also displays icons 6, 10, 14 and 18, each icon representing a respective aircraft other than ownship. The respective locations of aircraft icons 6, 10, 14, 18 relative to the location of the ownship icon 2 generally indicate the respective current positions of the other aircraft relative to ownship. A person of ordinary skill in the art will recognize that movement of a particular aircraft icon relative to ownship icon 2 on the display screen indicates the movement of the corresponding other aircraft relative to ownship, not movement relative to an Earth-based frame of reference. For example, if ownship and the aircraft represented by icon 14 were traveling in parallel at the same speed, the position and orientation of aircraft icon 14 relative to the fixed position of ownship icon 2 would not change.

In addition, the display screen shown in FIG. 1 displays respective trend vectors 8, 12, 16, 20 which extend from the forward vertices of the associated aircraft icons 6, 10, 14, 18. In this example, each trend vector takes the form of a solid line. These trend vectors generally indicate the current trends, i.e., turning (left or right) or going straight, of the other aircraft. More specifically, trend vector 12 indicates that the aircraft represented by icon 10 is going straight; trend vectors 8 and 20 indicate that the aircraft respectively represented by icons 6 and 18 are turning right; and trend vector 16 indicates that the aircraft represented by icon 14 is turning left. In the event that a current trend remains constant, then the trend vectors will also generally indicate the future path or track that corresponding other aircraft will travel during the next predefined interval of time. In this case, the distal termination of each trend vector generally indicates the future position of the nose of a respective aircraft after expiration of that next predefined time interval. Similarly, the length of each trend vector generally indicates the distance that a respective aircraft will travel during that next predefined time interval.

In accordance with the embodiment depicted in FIG. 1, the traffic display system onboard ownship comprises a plurality of computers or processors, hereinafter referred to as a "computer system". This computer system processes traffic data broadcast by other aircraft within the vicinity of ownship. When in a "current trend" mode, this computer system causes a traffic display unit (e.g., the cockpit navigation display) to display symbology indicating the current position, current heading and current trend of each other aircraft, as seen in the exemplary screen shot of FIG. 1.

As previously explained with reference to FIG. 1, the trend vectors 8, 12, 16 and 20 indicate the respective current trends of other aircraft respectively represented by icons 6, 10, 14 and 18. Trend vector 12 indicates that the aircraft represented by icon 10 is traveling straight. The length of trend vector 12 is determined as a function of the airspeed/groundspeed (as broadcast) of the aircraft represented by icon 10 and generally indicates (relative to the scale of the display screen) the distance that will be traveled by that aircraft during the next predefined time interval. Similarly, in the case of icons 6, 14 and 18, the length of each curved trend vector 8, 16 and 20 is determined as a function of the airspeed/groundspeed of the respective aircraft and generally indicates (relative to the scale of the display screen) the distance that will be traveled by the respective aircraft during the next predefined time interval. In addition, radius of curvature of each curved trend vector 8, 16 and 20 is determined as a function of the turning radius of the respective aircraft. As previously noted, the turning radius can be computed based at least in part on information transmitted by the other aircraft, including at least some of the following: speed, altitude, heading (from which rate of change of heading can be calculated), current bank angle, maneuver occurrence, wind direction and wind speed. Equations for calculating the radius of a curved path of travel by an aircraft are well-known in the art and are based on the laws of geometry, aerodynamics and physics.

In accordance with further embodiments, the system has an "extrapolated position" display mode that displays the future traffic situation relative to ownship position after the expiration of a future predefined time interval. In a preferred embodiment, the display mode (e.g., "current trend" versus "extrapolated position") can be selected by the flight crew, e.g., by operation of a switch. Alternatively, the system could have an "extended position" display mode, but not have a "current trend" display mode. The operation and components of a system in accordance with a preferred embodiment will now be described with reference to FIG. 2.

Figure 2:
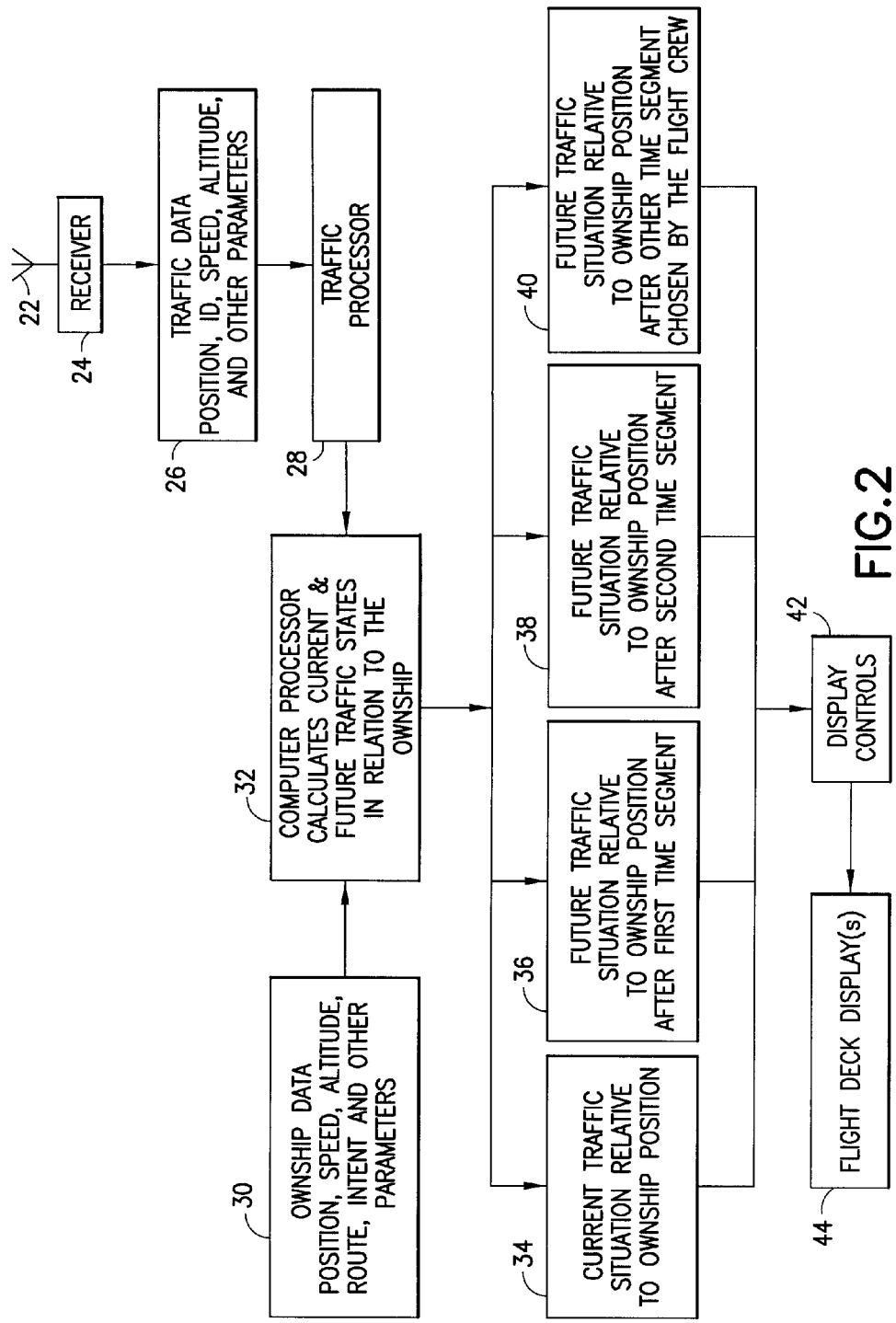
FIG. 2 is a hybrid block diagram/flowchart showing a system and a method for displaying (e.g., on a navigation display) symbology representing air traffic which is in the vicinity of ownship in accordance with one embodiment.

FIG. 2 shows a system for displaying traffic symbology on one or more flight deck displays 44 based on traffic information broadcast by other aircraft. The system has an antenna 22 for converting traffic data signals broadcast by aircraft (e.g., ADS-B traffic information) located in the vicinity of ownship into electrical signals, which are received by a receiver 24. The broadcast traffic data 26 includes the following information for each broadcasting aircraft: position, ID, heading, speed, altitude, and bank angle of the aircraft, and speed at the aircraft's location, and other parameters. The broadcast traffic data 26 may further include the following maneuver occurrence information: turn information, climb, descend, turn stop, climb/descent stop, no maneuver. This information reports what maneuver the other aircraft is currently performing. All of the received traffic data is processed by a traffic processor 28, which filters and stores the traffic data and then continually sends signals representing that traffic data to a computer processor 32.

The computer processor 32 also receives ownship data 30, which may include information concerning the position, heading, speed, altitude, route, maneuver occurrence and other parameters. Based on the available traffic information, the computer processor 32 calculates the current and future traffic states of other aircraft in relation to ownship. In the example shown in FIG. 2, the computer processor 32 converts the results of the calculations into the proper format for display as a page of graphical data on the traffic display screen.

Blocks 34, 36, 38 and 40 in FIG. 2 represent respective selectable pages for display. More specifically, page 34 includes symbology arranged to show the current traffic situation relative to ownship position; page 36 includes symbology arranged to show the predicted future traffic situation relative to ownship position after a first predefined time segment has expired; page 38 includes symbology arranged to show the predicted future traffic situation relative to ownship position after a second predefined time segment, subsequent to the first predefined time segment, has expired; and page 40 includes symbology arranged to show the future traffic situation relative to ownship position after some other predefined time interval chosen by the flight crew has expired. For example, the chosen predefined time interval can be equal to N times the predefined time segment, where N is an integer equal to or greater than three.

The flight crew is provided with an interface, e.g., a rotatable knob or buttons, for selecting which page should be displayed. This selection is inputted to a display controller 42, which controls what page is displayed on the flight deck display(s) 44 as a function of the flight crew selection. In accordance with one embodiment, a selected one of pages 34, 36, 38 and 40 is displayed on a flight deck display 44. In accordance with another embodiment, the current traffic situation page 34 is displayed on one flight deck display, while a selected one of the future traffic situation pages 36, 38 and 40 is displayed on a different flight deck display.

Exemplary navigation display screen shots (corresponding to the above-described pages) are presented in FIGS. 3-6.

Figure 3:
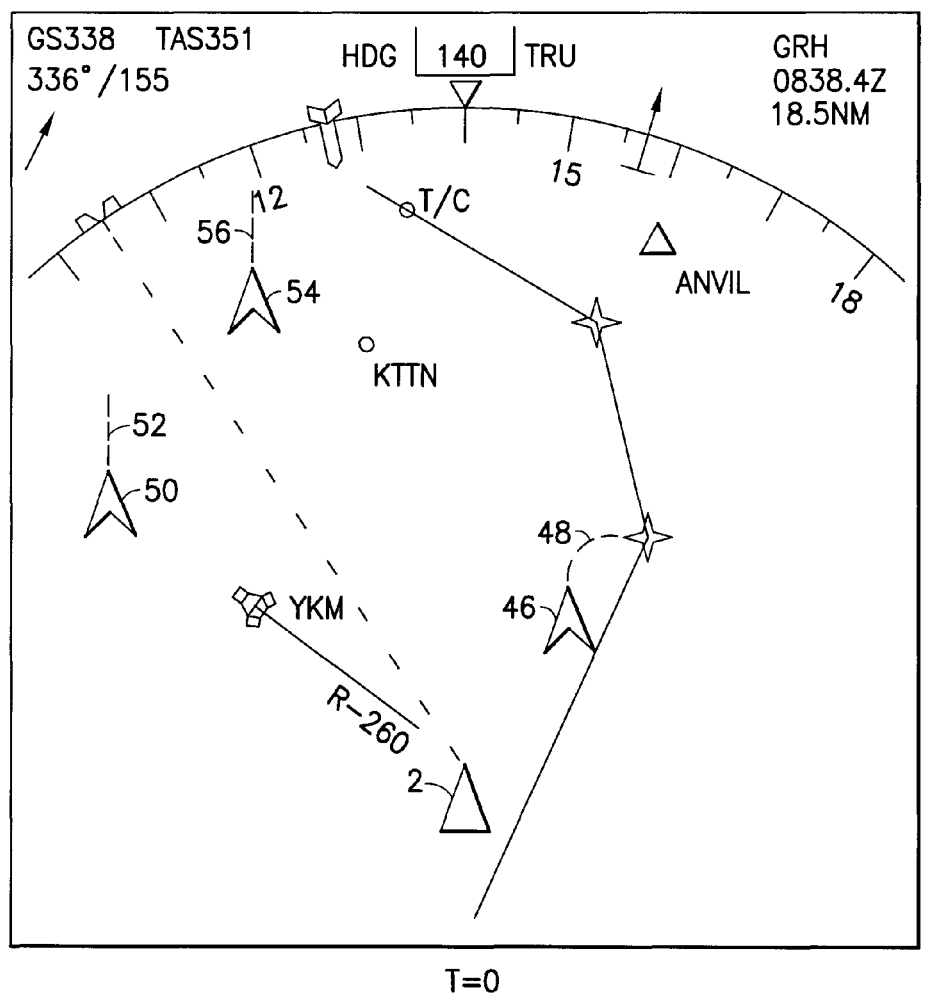
FIG. 3 is another diagram showing a screen of a cockpit navigation display unit that is displaying symbology in a "current trend" display mode, which symbology indicates the current positions of other aircraft relative to ownship and their current trends at time T=0.

FIG. 3 shows a screen of a cockpit navigation display unit which, as was the case in FIG. 1, is displaying symbology in a "current trend" display mode. This symbology indicates the current positions of other aircraft relative to ownship and their current trends at time T=0. Again equilateral triangle 2 is the ownship icon. The screen shown in FIG. 3 also displays aircraft icons 46, 50 and 54, each icon representing a respective aircraft other than ownship. The respective locations of aircraft icons 46, 50, 54 relative to the location of the ownship icon 2 generally indicate the respective current positions of the other aircraft relative to ownship.

In addition, the display screen shown in FIG. 3 displays respective trend vectors 48, 52 and 56, which extend from the forward vertices of the associated aircraft icons 46, 50 and 54. In this example, each trend vector takes the form of a set of three equally spaced line segments. These trend vectors generally indicate the current trends, i.e., turning (left or right) or going straight, of the other aircraft. More specifically, trend vector 48 indicates that the aircraft represented by icon 46 is turning right; and trend vectors 52 and 56 indicate that the aircraft respectively represented by icons 50 and 54 are going straight.

The total length of each trend vector 52 and 56 is determined as a function of the airspeed/groundspeed (as broadcast) of the respective aircraft represented by icons 50 and 54 and generally indicates (relative to the scale of the display screen) the distance that will be traveled by that aircraft during the next predefined time interval. Each spaced line segment represents an equal interval of time. For example, if the future predefined time interval is 2 minutes, each of the three spaced line segments of trend vector 52 would represent the expected path of travel during a respective 40-second interval. As used herein, the term "spaced line segment" includes one line segment and one adjacent space.

Similarly, in the case of aircraft icon 46, the total length of curved trend vector 48 is determined as a function of the airspeed/groundspeed of the respective aircraft and generally indicates (relative to the scale of the display screen) the distance that will be traveled by the respective aircraft during the next predefined time interval. In addition, the radius of curvature of curved trend vector 48 is determined as a function of the turning radius of the respective aircraft in well-known manner.

Figure 4:
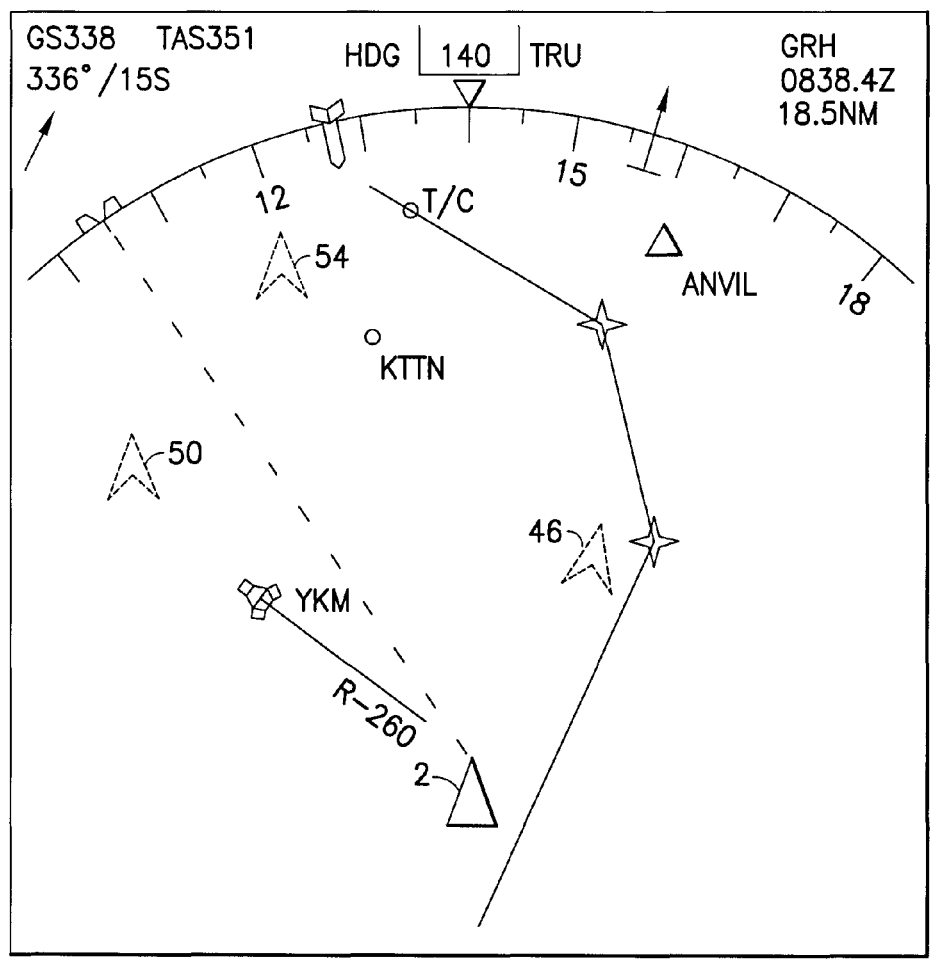
FIGS. 4-6 are diagrams showing a screen of a cockpit navigation display unit that is displaying symbology in an "extrapolated position" display mode, which symbology indicates the extrapolated positions of other aircraft relative to ownship at times T=1 (FIG. 4), 2 (FIG. 5) and 3 (FIG. 6).
Figure 5:
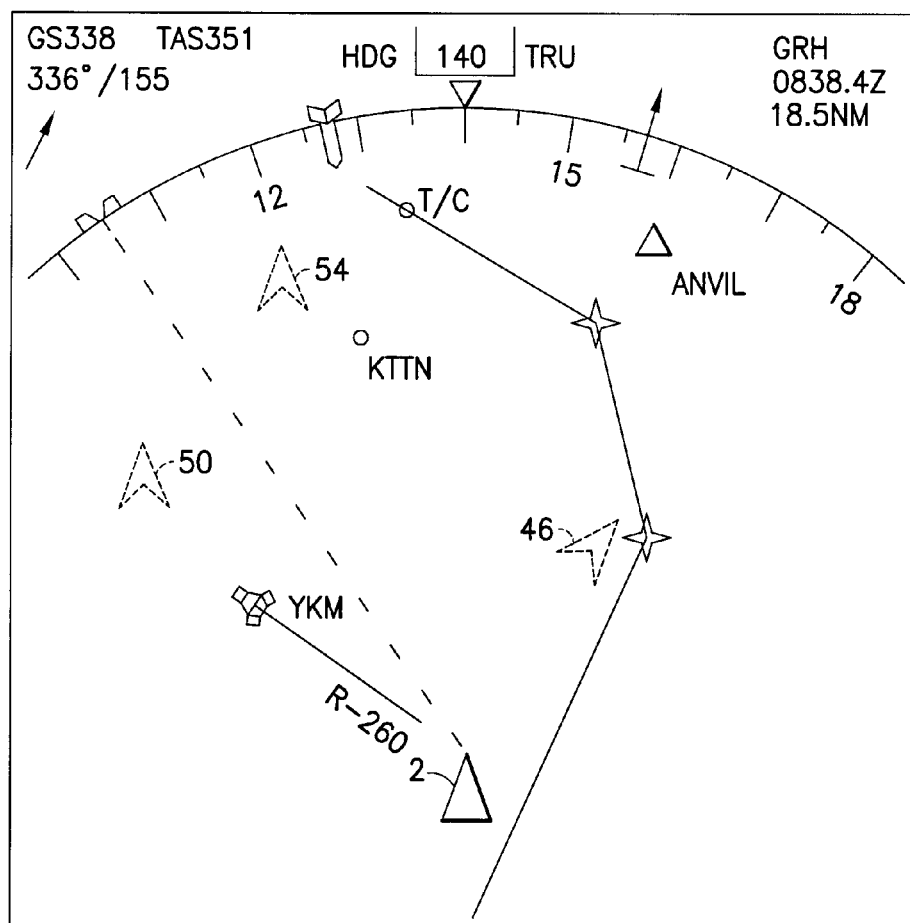
Figure 6:
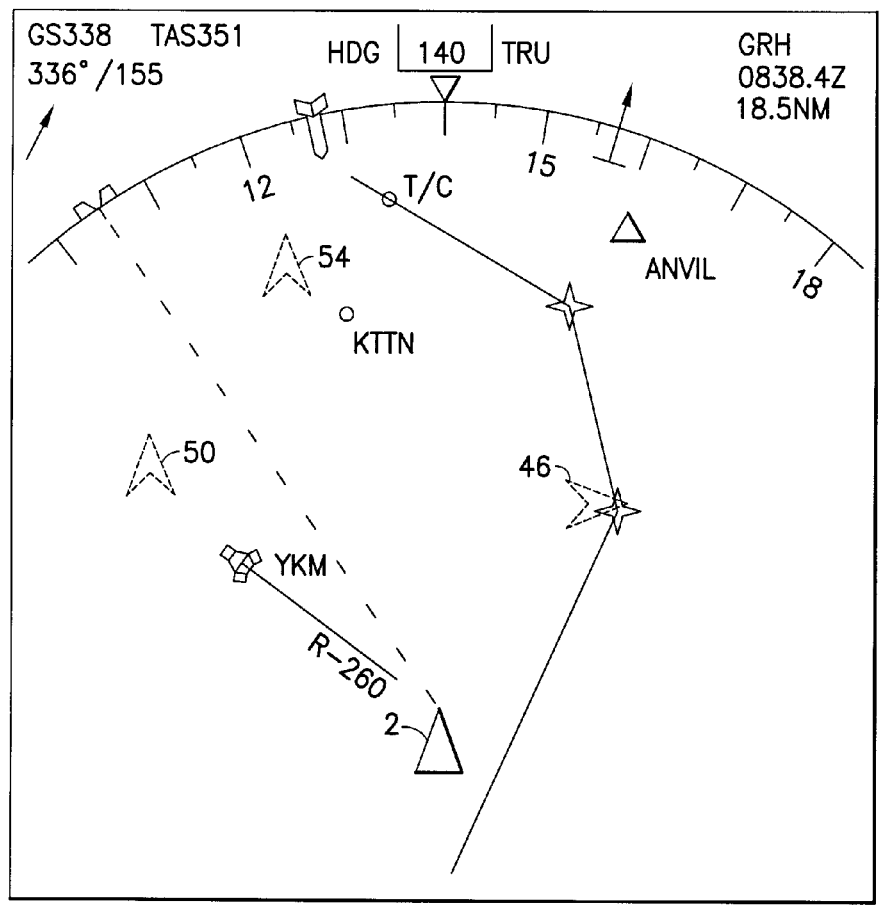

FIGS. 4-6 are diagrams showing a screen of a cockpit navigation display unit that is displaying symbology in an "extrapolated position" display mode, which symbology indicates the extrapolated positions of other aircraft relative to ownship at times T=1 (FIG. 4), 2 (FIG. 5) and 3 (FIG. 6). The value of T indicates the duration of the movement from a current position to the extrapolated position of the aircraft in units of time equal to a predefined time interval. For example, if the predefined time interval were set at 1 minute, then the value T=3 would indicate that each trend vector reflects the distance to be traveled by a respective other aircraft during the next 3 minutes.

In each of FIGS. 4-6, ownship is represented by icon 2 and other aircraft in the vicinity of ownship are represented by dashed aircraft icons 46, 50 and 54. The use of dashed aircraft icons in FIGS. 4-6 is in contrast to the solid aircraft icons displayed in the screen shot of FIG. 3. These dashed icons indicate to the flight crew that the associated aircraft are being shown in their extrapolated positions as opposed to their current positions, as seen in FIG. 1. However, it is obvious that contrast between icons indicating extrapolated positions as opposed to icons indicating current positions could also be achieved through the use of different symbols with different shapes and colors.

The flight crew may scan through the respective screen shots of FIGS. 4-6 in sequence by any suitable means, for example, by pressing a button. The screen shot seen in FIG. 4 displays the extrapolated positions (and projected headings) of aircraft in the vicinity of ownship at a first time in the future, that first time being separated from the current time by one predefined time interval. The flight crew could then press a button to cause the screen shot of FIG. 5 to replace the screen shot of FIG. 4. The screen shot seen in FIG. 5 displays the extrapolated positions (and projected headings) of aircraft in the vicinity of ownship at a second time in the future, that second time being separated from the current time by two predefined time intervals. Thereafter, the flight crew can press a button to cause the screen shot of FIG. 6 to replace the screen shot of FIG. 5. The screen shot seen in FIG. 6 displays the extrapolated positions (and projected headings) of aircraft in the vicinity of ownship at a third time in the future, that third time being separated from the current time by three predefined time intervals. And so forth. As the flight crew view the screen shots in sequence, the crew members can observe whether any other aircraft is getting closer to ownship to the point of being in potential conflict. The extrapolated position of an aircraft can be readily calculated based on information such as the current position, heading, speed, altitude, bank angle and maneuver of the aircraft, its rate of change of heading, and the wind speed and direction using well-known equations of motion. It should be appreciated that the placement of each aircraft icon on the display screen will change as a function of the respective other aircraft's position relative to ownship and does not represent changes in position relative to an Earth-based fixed frame of reference.

FIG. 7 shows a system for displaying traffic symbology on one or more traffic controller's displays 82 based on traffic information broadcast by air traffic which is in the vicinity of a ground-based traffic controller's station in accordance with another embodiment. The system has an antenna 62 for converting traffic data signals broadcast by aircraft (e.g., ADS-B traffic information) located in the vicinity of traffic controller's station into electrical signals, which are received by a receiver 64. The broadcast traffic data 66 includes the same information as previously described with reference to FIG. 2. All of the received traffic data is processed by a traffic processor 68, which filters and stores the traffic data and then continually sends signals representing that traffic data to a computer processor 70.

Based on the available traffic information, the computer processor 70 calculates the current and future traffic states of other aircraft in relation to the fixed ground station. In the example shown in FIG. 7, the computer processor 70 converts the results of the calculations into the proper format for display as a page of graphical data on the traffic controller's display screen 82. Blocks 72, 74, 76 and 78 in FIG. 7 represent respective selectable pages for display. In contrast to the embodiment of FIG. 2, in the embodiment depicted in FIG. 7 the selection is made by a traffic controller. More specifically, page 72 includes symbology arranged to show the current traffic situation relative to the ground station; page 74 includes symbology arranged to show the predicted future traffic situation relative to the ground station after a first predefined time segment has expired; page 76 includes symbology arranged to show the predicted future traffic situation relative to the ground station after a second predefined time segment, subsequent to the first predefined time segment, has expired; and page 78 includes symbology arranged to show the future traffic situation relative to the ground station after some other predefined time interval chosen by the traffic controller has expired. For example, the chosen predefined time interval can be equal to N times the predefined time segment, where N is an integer equal to or greater than three.

The traffic controller is provided with an interface, e.g., a rotatable knob or buttons, for selecting which page should be displayed. This selection is inputted to a display controller 80, which controls what page is displayed on the traffic controller's display(s) 82 as a function of the traffic controller's selection. In accordance with one embodiment, a selected one of pages 72, 74, 76 and 78 is displayed on a traffic controller's display 82. In accordance with another embodiment, the current traffic situation page 72 is displayed on one traffic controller's display, while a selected one of the future traffic situation pages 74, 76 and 78 is displayed on a different traffic controller's display.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiments disclosed herein.

As used in the claims, the term "computer system" should be construed broadly to encompass a system having at least one computer or processor, and which may have two or more interconnected computers or processors.

Furthermore, the method claims set forth hereinafter should not be construed to require that the steps recited therein be performed in alphabetical order or in the order in which they are recited.

The invention claimed is:

1. A method for displaying traffic information on a traffic display unit, comprising:
receiving data from a first vehicle that indicates or can be used to derive a current position, a current heading and a current trend of the first vehicle; and displaying symbology that indicates the current position, current heading and current trend of the first vehicle relative to a frame of reference, wherein said symbology comprises an icon placed and oriented to indicate the current position and current heading of the first vehicle, and a line or series of line segments extending away from the icon along a path that indicates the current trend of the first vehicle, wherein a distance from a terminus of said line or series of line segments to said icon indicates, relative to a scale of the traffic display unit, a distance that the first vehicle will travel during a future predefined time interval.

2. The method as recited in claim 1, wherein said line or series of line segments follow(s) a straight path extending away from the icon if the current trend is that the first vehicle is going straight or, alternatively, follows a curved path if the current trend is that the first vehicle is turning.

3. The method as recited in claim 2, wherein a radius of said curved path is indicative of a turn radius of the first vehicle.

4. The method as recited in claim 1, wherein the first vehicle is an aircraft.

5. The method as recited in claim 1, wherein the traffic display unit is onboard a second vehicle.

6. A method for displaying traffic information on a traffic display unit, comprising:
   (a) receiving data from a first vehicle that indicates or can be used to derive a current position, a current heading and a current trend of the first vehicle;
   (b) determining which one of a plurality of display modes has been selected;
   (c) displaying symbology that indicates a future position and a future heading of the first vehicle relative to a frame of reference if a determination has been made in step (b) that a first display mode has been selected; or
   (d) displaying symbology that indicates the current position, current heading and current trend of the first vehicle relative to the frame of reference if a determination has been made in step (b) that a second display mode different than said first display mode has been selected.

7. The method as recited in claim 6, wherein the traffic display unit is onboard a second vehicle.

8. The method as recited in claim 6, wherein the first vehicle is an aircraft.

9. A system for displaying traffic information, comprising a display screen and a computer system programmed to perform the following operations:
   receiving data from a first vehicle that indicates or can be used to derive a current trend of the first vehicle; and
   causing said display screen to display symbology that indicates the current position, current heading and current trend of the first vehicle relative to a frame of reference, wherein said symbology comprises an icon placed and oriented to indicate the current position and current heading of the first vehicle, and a line or series of line segments extending away from the icon along a path that indicates the current trend of the first vehicle, wherein a distance from a terminus of said line or series of line segments to said icon indicates, relative to a scale of the traffic display unit, a distance that the first vehicle will travel during a future predefined time interval.

10. The system as recited in claim 9, wherein said line or series of line segments follow(s) a straight path extending away from the icon if the current trend is that the first vehicle is going straight or, alternatively, follows a curved path if the current trend is that the first vehicle is turning.

11. The system as recited in claim 10, wherein a radius of said curved path is indicative of a turn radius of the first vehicle.

12. The system as recited in claim 9, wherein the first vehicle is an aircraft.

13. The system as recited in claim 9, wherein the traffic display unit is onboard a second vehicle.

14. A system for displaying traffic information, comprising a display screen and a computer system programmed to perform the following operations:
   (a) receiving data from a first vehicle that indicates or can be used to derive a current position, a current heading and a current trend of the first vehicle;
   (b) determining which one of a plurality of display modes has been selected;
   (c) displaying symbology that indicates a future position and a future heading of the first vehicle relative to a frame of reference if a determination has been made in step (b) that a first display mode has been selected; or
   (d) displaying symbology that indicates the current position, current heading and current trend of the first vehicle relative to the frame of reference if a determination has been made in step (b) that a second display mode different than said first display mode has been selected.

15. The system as recited in claim 14, wherein said display screen is onboard a second vehicle.

16. The system as recited in claim 14, wherein the first vehicle is an aircraft.

* * * * *